UNITED STATES PATENT OFFICE.

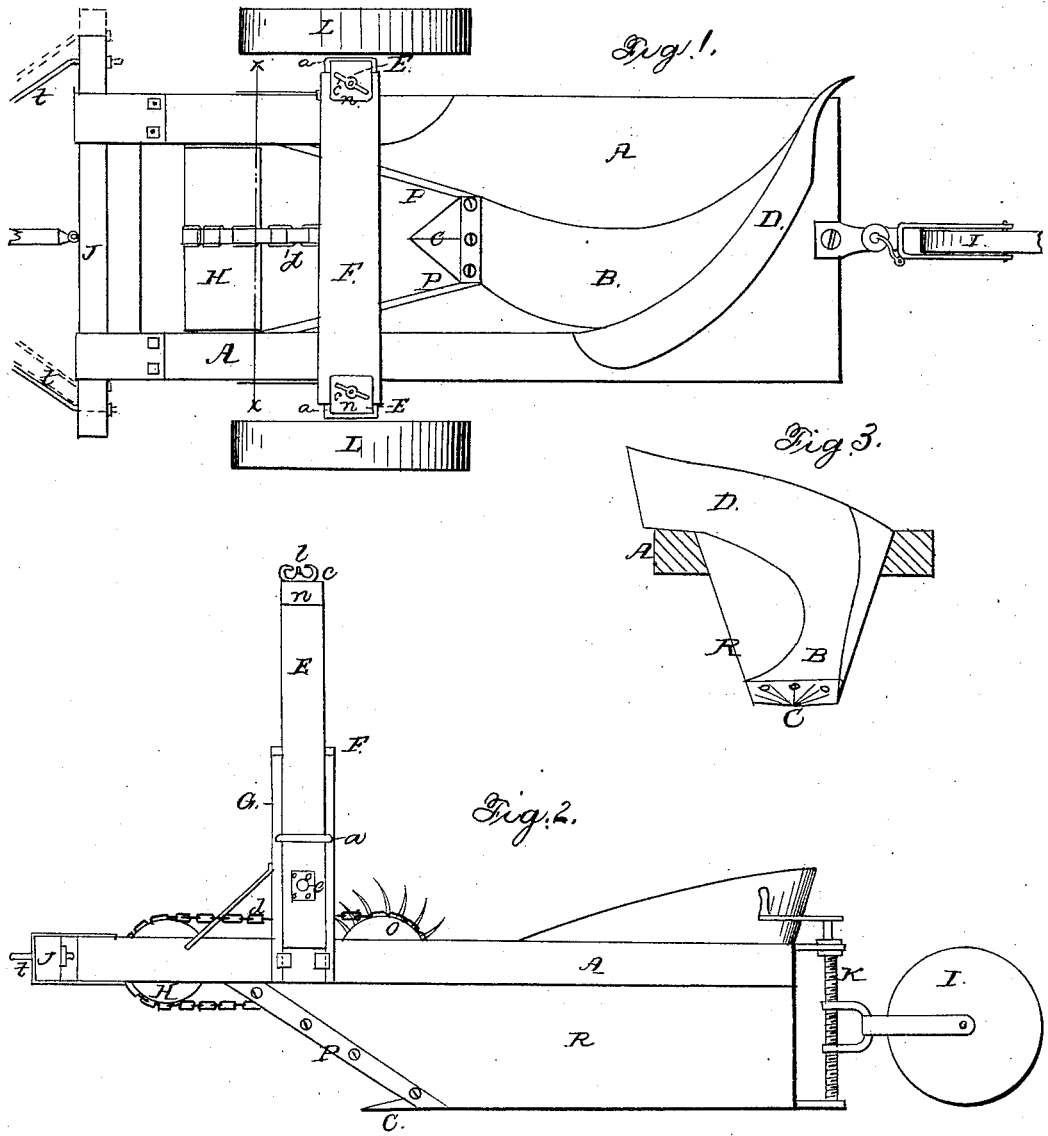

TUNIS I. BURHYTE, OF FOND DU LAC, WISCONSIN.

IMPROVED DITCHING-PLOW.

Specification forming part of Letters Patent No. 51,014, dated November 21, 1865.

*To all whom it may concern:*

Be it known, that I, TUNIS I. BURHYTE, of Fond du Lac, in the county of Fond du Lac and State of Wisconsin, reprectfully represents that he has invented certain new and useful Improvements in Ditching-Plows; and I do hereby declare that the following is a clear, full, and exact description thereof, reference being had to the accompanying drawings, and the letters of reference marked thereon, making part of this specification, similar letters indicating corresponding parts in the various figures.

The nature of my invention consists in making a plow or scoop with cutting-edges of the size and shape of the ditch to be cut, and so arranging a chute or mold-board that it shall receive the slice of earth cut out and turn it upside down and deposit it alongside of the ditch, parallel therewith.

To enable others skilled in the art to construct and use my improved machine, I will proceed to describe it.

Figure 1 is a top-plan view. Fig. 2 is a side elevation with the front wheels removed; and Fig. 3 is a transverse section of the same, taken on the line of $x\ x$ of Fig. 1, looking from the front backward.

A represents the frame or body of the machine, which may be made of strong plank or timber. Toward the front portion of this frame, on each side, an upright, G, is secured, connected at their top by a cross-bar, F. An upright, E, is secured to each of the posts G in such a manner that it can be raised or lowered at will, and to the lower end of these movable uprights E an axle, $e$, is attached, on which the wheels L are mounted. A rod, $l$, extends from the post G up alongside of E, passing through a metal cap, $n$, attached to the top of the latter, where it is provided with a nut, $c$, by which the sliding posts E, with the wheels L, may be adjusted and held at any desired height.

Below the main frame A, I attach a body, R, which in its transverse section is of the size and shape that it is desired to cut the ditch. This body is about two-thirds as long as the main frame, extending from the rear toward the front. This cutting-body may be made entirely of iron, or partly of wood and partly of iron, as shown in the drawings. Each side of this body R, at its front end, is inclined backward at an angle of about forty-five degrees, more or less, as shown in Fig. 2, and has a sharp cutting-edge of steel, as represented by P. At the front portion of the bottom B a triangular share or cutter, C, is secured, as shown clearly in Fig. 1. From the point where the share C is attached the channel B rises gradually as it approaches the rear end of the machine, the chute or channel formed between the sides of R inclining at first to the left in a gentle curve, and then curving around to the right, and passing off over the right side of the body A, near its rear end, as shown in Fig. 1. A raised portion, D, is added, as shown, in the rear of the channel, to form a continuation thereof, as the latter rises to a level with the upper surface of the frame A, and to act as a mold-board to assist in turning over the slice of earth cut by the machine. The frame A is considerably wider than the body R, and projects over on each side, as shown in Figs. 1 and 2.

To the rear end of the machine is attached a caster-wheel, I, secured to a rod, K, in such a manner that it can be raised or lowered by simply turning said rod, a handle or wrench being used for that purpose.

Immediately above the share C a roller, O, is mounted, as shown in Fig. 2, and is connected by an endless chain, $d$, to another roller, H, similarly mounted in the front portion of the frame A, the roller O being provided with spikes or teeth projecting radially therefrom, or nearly so, as shown in Fig. 2, this wheel O being removed in Fig. 1 for the purpose of more clearly exposing the share C.

A cross-bar, J, is attached to the front of the machine in such a manner that it can be adjusted laterally, and to this bar J two draft-rods, $t\ t$, are attached, as shown, the two rods converging and uniting a short distance in front of the machine. These rods $t$ are secured by nuts on their rear ends, so that by screwing up either of said nuts the center of draft may be thrown to the right or left, as may be desired, to regulate the movements of the machine and counteract the tendency of the slice to throw its rear end around to the left. This adjustment may also be effected by moving the cross-bar J, with the draft-rods t, laterally, as indicated in red lines.

The operation is as follows: When the machine has been placed in position the wheels L are raised until they stand nearly on a level with the bottom of A, (in case it be desired to cut a a full-sized ditch,) and the caster-wheel I is adjusted so that it reaches a little below the bottom of the body R. Motion is then imparted to the machine by means of a windlass, or in any other suitable manner, and as it is moved forward the share C and cutters P enter the ground with the body R, cutting loose a slice of earth of the size and shape transversely of the body R. As the machine moves forward this slice of earth is forced up the inclined channel B, in which it is gradually turned over on its side, and is finally delivered at the right-hand side of the machine, bottom side up, as shown in Fig. 4. When once in the ground the roller H will roll upon the surface, and by means of the chain d will impart motion to the roller O, by which means the teeth of the latter are made to assist in forcing the slice of earth up the inclined channel B. It also serves to relieve the wheels L of a portion of the weight of the machine, and of the pressure caused by the tendency of C to cut deeper into the earth. These rollers are of special importance in moist or soft ground; but in dry hard land they may be dispensed with, if desired, especially the rear one.

It is obvious that by adjusting the wheels L properly the machine may be made to cut any desired depth, varying from an inch to the full capacity of the machine. I usually construct them of a size to cut a ditch complete at one operation, twenty-four inches deep by thirty-six inches wide at the top, and eighteen inches wide at the bottom.

It is very important the cutting-edges P be inclined backward, as shown, and that their edges extend in an unbroken line from top to bottom. By this means grass, weeds, sticks, roots, &c., are cut through and prevented from sliding up and clogging the machine or throwing it out of the ground. When it is desired to move it from place to place the wheels L and I are depressed so as to come below the bottom, when it can be drawn the same as any wheeled vehicle.

By having the machine rest upon the wheels and roller, as described, when operating, the friction is greatly lessened, and much less power is therefore required to operate it.

Having thus fully described my invention, what I claim is—

1. A ditching-plow having its side cutters, P, inclined backward, as shown, and extending in an unbroken line from top to bottom, in combination with the horizontal cutter C, arranged substantially as shown and described.

2. The channel B, curved first to the left and then to the right, as shown and described.

3. Mounting the plow upon the independent adjustable side wheels, L, and the adjustable caster-wheel I, arranged to operate as and for the purpose set forth.

4. The roller H, in combination with the roller O, provided with the curved teeth, and the sprocket-chain d, arranged to operate as herein described.

5. Providing a ditching-machine constructed as shown with the adjustable draft-rods t, as and for the purpose set forth.

TUNIS I. BURHYTE.

Witnesses:
W. C. DODGE,
P. TELL DODGE.